US012807779B2

(12) United States Patent
Kunst et al.

(10) Patent No.: US 12,807,779 B2
(45) Date of Patent: Nov. 24, 2026

(54) METHOD OF CLOSED LOOP RECYCLING OF POLYLACTIC ACID

(71) Applicant: Arapaha B.V., Maastricht (NL)

(72) Inventors: Johan Albert Frans Kunst, Maastricht (NL); Jorn Ekkehart Behage, Maastricht (NL); Jan Jager, Groningen (NL); Marco Brons, Rheden (NL)

(73) Assignee: ARAPAHA B.V., Maastricht (NL)

( * ) Notice: Subject to any disclaimer, the term of this patent is extended or adjusted under 35 U.S.C. 154(b) by 472 days.

(21) Appl. No.: 18/290,877

(22) PCT Filed: Aug. 2, 2022

(86) PCT No.: PCT/EP2022/071635

§ 371 (c)(1),
(2) Date: Jan. 22, 2024

(87) PCT Pub. No.: WO2023/012142

PCT Pub. Date: Feb. 9, 2023

(65) Prior Publication Data

US 2024/0368368 A1 Nov. 7, 2024

(30) Foreign Application Priority Data

Aug. 2, 2021 (NL) ...................................... 2028900

(51) Int. Cl.
*C08J 11/14* (2006.01)

(52) U.S. Cl.
CPC ............ *C08J 11/14* (2013.01); *C08J 2367/04* (2013.01)

(58) Field of Classification Search
CPC .. B01J 2219/00274–00677; C08J 11/14; C08J 2367/04
See application file for complete search history.

(56) References Cited

U.S. PATENT DOCUMENTS

| | | | | |
|---|---|---|---|---|
| 4,620,032 | A | 10/1986 | Doerr | |
| 6,310,218 | B1 | 10/2001 | O'Brien et al. | |
| 6,630,603 | B1 | 10/2003 | Van Breugel et al. | |
| 2012/0029228 | A1 | 2/2012 | Coszach et al. | |
| 2012/0142958 | A1 | 6/2012 | Coszach et al. | |
| 2013/0023674 | A1 | 1/2013 | Narayan et al. | |
| 2014/0316097 | A1 | 10/2014 | Hagen | |
| 2015/0065732 | A1 * | 3/2015 | Yang .................... | C07D 319/12 549/274 |
| 2016/0280908 | A1 | 9/2016 | Hagen et al. | |

FOREIGN PATENT DOCUMENTS

| | | | |
|---|---|---|---|
| CZ | 299244 | B6 | 5/2008 |
| WO | 97/20886 | A1 | 6/1997 |
| WO | 00/56693 | A1 | 9/2000 |
| WO | 01/44157 | A1 | 6/2001 |
| WO | 2014/139730 | A1 | 9/2014 |
| WO | 2015/112098 | A1 | 7/2015 |

* cited by examiner

*Primary Examiner* — Stephen E Rieth
(74) *Attorney, Agent, or Firm* — Richard M. Goldberg

(57) ABSTRACT

A process for chemically recycling polylactic acid (PLA), includes at least a first stage of depolymerisation of the PLA and a separate second consecutive stage of depolymerisation, to which stages the PLA is subjected in a continuous manner, wherein in the first stage, the PLA is continuously fed to an extruder operated at a temperature above the melting temperature of the PLA, while a water is co-fed to the extruder, in order to produce a fluid mixture including a melt of the at least partly depolymerised PLA, and in the second stage, the fluid mixture is continuously fed to a continuously stirred tank reactor (CSTR) operated at a temperature above the melting temperature of the PLA, while co-feeding water to the CSTR, wherein a residence time in the CSTR is used to provide at the outlet of the CSTR a continuous stream of PLA depolymerised into an oligomeric ester.

34 Claims, 2 Drawing Sheets

METHOD OF CLOSED LOOP RECYCLING OF POLYLACTIC ACID

GENERAL FIELD OF THE INVENTION

The invention pertains to the field of design of durable consumer products comprising polymers, in particular the polyester polylactic acid (PLA), to enable design of products that allow closed loop recycling of these polymers.

BACKGROUND OF THE INVENTION

Since the rise of the use of synthetic polymers, in particular plastics, pollution with these polymers in the form of products made of these polymers has raised explosively. At the same time, increasing carbon dioxide levels in the atmosphere create climate change which is increasingly threatening the livelihood of many people around the world. Human population is still growing fast and predicted to hit 11 billion people by the year 2100. Microfibers of synthetic fossil-based polymer materials are found on Mount Everest, in the Mariana Trench and in the ice cap of Antarctica creating health challenges to humans and in fact all life on earth.

With human consumption expected to increase with the increasing population the pressure on the resources the earth can provide is reaching a critical point of no return. To continue to enjoy well performing and aesthetically beautiful products therefore a drastic change is needed in how products are designed, manufactured, used, and recycled. Although for many types of products closed loop recycling is relatively easy to accomplish, for example metal products, or 100% wooden products, in particular products that comprise polymers are more challenging to arrive at fully closed loop recycling. It appears that in particular the polymers provide for challenges in the sense that good performance, ease of recycling and low fossil basis are difficult to get combined.

When analysing which plastics can best be used to produce durable consumer products one could first look at polyolefins, like polyethylene and polypropylene, as they are the most used plastics in the world. However, due to the inertness of the material and the strength of the carbon-to-carbon bonds in their polymeric backbone they do not lend themselves very well outside of packaging applications. The end-of-life scenarios for polyolefins that are under development all require a lot of energy through e.g., pyrolysis. This does not allow polyolefin for the creation of low carbon footprint fully circular products.

Another group of polymers used to create recyclable products are polycondensates such as polyesters, including specifically polylactic acid, as well as polyamides. These polymers are made in a reversible process, making them suitable for chemical recycling. Next to this, developments are ongoing to replace fossil-based polymers with biobased versions of these polymers. For polyethylene terephthalate (PET) biobased MEG and biobased PTA are in development, and for polyamide 6 (PA 6) biobased caprolactam is being developed. However, these developments are not yet commercially available at large scale.

Polylactic acid (PLA) is a widely used biobased plastic, and its global production volume is going through a rapid growth phase with new (recent) plants announced in Thailand, China, Russia as well as France, together bringing the global capacity in the range of 0.5 to 1 million ton per year. Its monomer lactic acid is produced from sugars taken from natural feedstock such as sugar cane, sugar beets, and corn through an enzymatic process, hence it is a biobased polymer.

Studies have been done on the environmental footprint of PLA. showing that the main impact of PLA production is related to agricultural feedstock production and to the manufacturing process of PLA from sugar. PLA made from virgin feedstock such as sugar cane or corn has a global warming potential (GWP) of only 0.5 kg $CO_2$ equivalent per kg PLA, thereby significantly lower than petroleum-based polymers such as for instance polyester with a GWP of 2.2 kg $CO_2$ equivalent per kg PET.

Application of PLA is traditionally limited due to its limited mechanical and thermal properties and therefore its market introduction and use focuses on its alleged biodegradability. PLA is used predominantly in single use objects such as cups and plates. The biodegradability of PLA however is subject to debate. Depending on the type of PLA used, the degradability takes significantly longer than the time available for composting in industrial compositing facilities, which is typically no more than 11 days.

Additionally, the positioning on the basis of biodegradability stimulates consumers to litter PLA made products in the believe that they will degrade. However, if PLA is degraded in the environment, either in soil or sea, the degrading is so slow that even after 3 years, PLA based shopping bags are still strong enough to use. In fact, PLA barely decomposes in nature and requires special conditions to degrade (see Lambert, S.; Wagner, M. Environmental Performance of Bio-Based and Biodegradable Plastics: The Road Ahead. Chem. Soc. Rev. 2017, 46 (22), 6855-6871). Biodegrading can convert PLA into carbon dioxide and water, but not remove additives like colorants. By creating carbon dioxide, it does not offer a solution for climate change and the cycle from PLA back to useful product through biodegradation is a very long one, as it will take millions of years for the carbon dioxide to be converted back to organic matter. Biodegradation of PLA is therefore not a perfect solution for enabling closed loop recycling.

Over the years the performance of PLA has improved, and a wide range of grades are now commercially available. This development is made possible due to variations in molecular chain length, using variations of degree of the stereoisomers of PLA, or by including additives. As a result, PLA can be produced in many forms. With forms is meant the physical appearance or structure of the component. Such a form may be selected from the group consisting of monofilaments, fibres, yarns, woven fabrics, knitted fabrics, nonwoven fabrics, films, tapes, sheets, ropes, foams, blow moulded forms, thermoformed forms, injection moulded forms, 3D printed forms, resins, composites and honeycombs, allowing a very wide range of end products to be made from PLA. However, these grades typically have a biodegradability that takes even longer than standard PLA, making it not practical or economical to biodegrade these newer grades.

A further requirement for a useful and economic recycling process is that the recycling process itself results in relatively high value materials. During the de-polymerisation high temperatures are needed to break down the molecular chain to end up with oligomers and/or monomers. Due to these elevated temperatures racemisation inherently occurs, shifting the D/L ratio of the (stereospecific) PLA monomers, such as lactide, away from its original percentage towards a higher D/L ratio, thereby moving the PLA to more amorphous low-grade PLA (see Tsukegi et al., Racemisation behaviour of L,L-lactide during heating, Polymer Degradation and Stability 92 (2007) 552-559).

Current recycling processes for polymer materials can be separated in two main groups, namely mechanical and chemical recycling. In mechanical recycling, the products are collected, sorted, reduced in size and contaminations, such as soil or foreign objects, are removed as far as possible with washing steps. Then the products are dried, ground to flakes, homogenised and extruded to create a new granulate. The granulate may then be used to create new products. In the mechanical recycling process, contaminations in the actual polymer cannot really be removed, except for filtration of coarse particles.

PLA is less suitable for traditional mechanical recycling because due to its relatively weak chemical bonds in the backbone, the PLA will start to hydrolyse during mechanical recycling. The hydrolysis reduces the length of the polymeric chain and thus the molecular weight (as measured by the intrinsic viscosity). This results in a reduction in performance of the recycled PLA, which can only be overcome by mixing in up to as much as 30% of PLA made from virgin feedstock The recycled PLA can then only be used in lower demanding applications that require a low viscosity. Mechanical recycling also has the severe limitation that it does not cater for removal of additives, such as colorants, plasticizers, fillers, catalysts, UV scavengers, barrier materials, flame retardants, processing agents, etc. As a result, coloured PLA will remain coloured, with the final mix usually ending up close to black.

Chemical recycling of polymers per se, and polyesters such as PLA in particular, holds the promise to purify the broken-down polymers at molecular level, and thereby generating valuable new feedstock with sufficient economic value. A further reduction of the carbon footprint is possible by using PLA waste as feedstock for new PLA, by using enhanced recycling methods such as de-polymerisation. Using such chemical recycling methods, the global warming potential (GWP) expressed as kg $CO_2$ equivalent per kg PLA can further be reduced to only 27% of the GWP of PLA made out of virgin feedstock (see Piemonte et al. J. Polym. Environ (2013), 21:640-647)

Chemical recycling processes are already used at a commercial scale for polyamide-6 by Aquafil SpA and are currently being developed for polyesters. Chemical recycling follows the same initial steps of collecting and sorting, with the difference that the products are subjected to a de-polymerisation step. In chemical recycling, de-polymerisation occurs to recuperate the starting materials of the polymer, typically the purified monomers, or other materials, typically small molecules, that can be used as starting materials in various production processes.

Various distinct types of processes have been applied in order to chemically recycle polyester waste materials, and thus, each of these could be a starting point for recycling the polyester PLA.

A first class of processes for recycling polyester waste material is so-called energetic recycling such as pyrolysis and carbonisation. Pyrolysis of polyester waste was first described in the early 1980's. It is an alternative to polymer disposal in landfills. In general, polyester waste is pyrolysed without further purification of the plastic waste. The majority of pyrolyses are conducted to produce aliphatic and aromatic hydrocarbons as an alternative for fossil fuels or as a source for chemicals to use in various production processes. Carbonisation is a second method of pyrolyzing polyester waste materials.

However, the above described energetic recycling differs from chemical recycling processes, wherein recycling of polyester waste material is enabled by depolymerisation into the monomers and/or oligomers that are the building blocks of the actual polyester material, called chemolysis. This class can be divided in numerous sub-classes depending on the type of reactant used for the chemolysis.

An example is the application of ionic liquids for depolymerisation, first described around the year 2000. This method was developed to avoid the drawbacks of other methods like alcoholysis (high pressure and temperature as well as a heterogeneous reaction product) or acidic and alkaline hydrolysis (pollution problems) to provide an eco-friendly degrading agent for polymers and to enable degradation under moderate reaction conditions. However, no application of the obtained reaction products has hitherto been described.

As an alternative castor oil is applied for de-polymerisation. This method was originally developed to provide a renewable substitute of petrochemical agents (for example, glycols) for PET (polyethylene-terephtalate) de-polymerisation. After de-polymerisation, the reaction products were aimed for the preparation of polyurethane systems.

However, it appears to be very difficult to determine characteristic molecular weights due to the excessive amount of applied castor oil. Also, even with precise control of the reaction temperature a heterogeneous mixture of reaction products is obtained.

The degradation of polyester polymers using enzymes was first described in the 1970's. As the use of ionic liquids and castor oil, this bio-chemical method was developed to provide an eco-friendly procedure of polymer recycling in contrast to conventional chemical recycling methods. However, efficiency is rather low with respect to complete depolymerisation of the polyester, the time required is uneconomically long and hence quantitative recovery of homogeneous reaction products for re-use is not possible.

Alcoholysis for depolymerisation of polyesters was first described in the early 1990's. This method was developed to avoid the drawbacks of the acidic and alkaline hydrolysis (i.e. pollution problems) to provide a renewable and more eco-friendly degrading agent for polymers. Generally, polyester is depolymerised with an excess of an alcohol to yield corresponding esters of the corresponding acid and ethylene glycol. Among the alcoholysis methods, reaction with methanol has gained special importance because of the low price and the availability of methanol. Also, ethylene glycol (a diol, the use of which is sometimes classed separately as "glycolysis", although it falls in the class of alcoholysis) is used mainly in reactive extrusion to produce low molecular weight oligomers. However, these oligomers have to be separated and purified for further processing, since the crude reaction product consists of a heterogeneous mixture of monomer, oligomers, and polymers. Various other alcohols are described to be useful. However, in all cases mixtures of undefined low molecular weight oligomers are typically obtained. Another serious downside of alcoholysis is the need for a catalyst. The most important catalysts have been zinc acetate and manganese acetate. Further catalysts are cobalt acetate and lead acetate. The need of such catalysts hamper the wide application of alcoholysis for recycling polyester waste material.

Aminolysis and ammonolyis were developed for polyester recycling, since the reactivity of the amine-group is higher than the hydroxyl-group or alcohols used alcoholysis of polyester. However, for alcoholysis, the need for a metal catalyst remains.

Lastly, an alternative chemical recycling of polyester is given by the controlled de-polymerisation of polyester using blocking chain scission with defined amounts of the depolymerisation agent (see Geyer et al. in *EXPRESS Polymer Letters Vol.* 10, No. 7 (2016) 559-586). This method produces polyester oligomers of well-defined molecular weights in a greater range than existing chemical methods like alcoholysis. However, this method requires sorted polyester material, which has to be free of contaminants.

The challenges of polyester recycling in general also apply more specifically to the chemical recycling of PLA, of which an overview is given by P. Mckeown et al, Sus. Chem. 2020, 1, 1-22. Direct depolymerisation from PLA to lactides (a form of pyrolysis) is a promising route as it shortens the path back to PLA. A method for this process has been given by Narayan et al., US 2013/0023674 A1. Despite its promise this process has not been implemented as it appears complex to manage sufficient conversion to lactide, with a significant part of the PLA remaining as oligomer, reducing the economics of this process. Moreover, reasonably high temperatures are needed thereby increasing the risk of racemisation.

Other routes for chemical recycling use a route by which a solvent is used to bite back the polymeric chain. Typical solvents that can be used are alcohols (e.g., ethanol and ethylene glycol) or water as described here above. However, the industrial use of ethanol at temperatures above its flash point makes that the whole plant needs to be laid out with specific provisions to avoid explosions, making the investment cost significantly higher than when other non-flammable solvents are used. Ethylene glycol can also be used as solvent. Glycolysis in terms of chemical recycling refers to the insertion of ethylene glycol into the polymeric chains, breaking the ester linkages and replacing them with hydroxyl terminals. Glycolysis is commonly used for the recycling of polyester, however for PLA this route results in glycol lactates that cannot be easily converted back to a useful monomer to produce PLA, and in itself the glycol lactates do not have significant commercial applications yet to be useful (see T. Sripho, University Thesis).

The use of water as solvent, also referred to as hydrolysis (see for instance US20120142958 and US20120029228), is safe and is able to provide the monomer lactic acid (also referred to as full hydrolysis), which again can be used to create lactide and subsequently PLA. Hydrolysis is essentially the reverse of polycondensation (or dehydration): by adding water, the alkoxy groups are replaced with the original hydroxyl groups from the monomer. Due to the affinity of lactic acid with water however, in the existing processes a complex and expensive purification is needed to remove the remaining water from the lactide. Therefore, this route is practically and economically also less attractive to apply.

Another downside of the known processes is that they need relatively long residence times in the range of hours for the full depolymerisation. Attempts are made to reduce the residence times to improve the economics of the process using catalysts, increasing temperature to significantly above the melting point of the PLA. This gives additional complications to recover a valuable monomer composition as the catalyst may need to be removed prior to repolymerisation and the high temperatures and still long residence times give rise to racemisation.

To reduce the negative impact of the racemisation processes are described in which a chiral separation process is described by companies as Sulzer Ltd, Total Corbion PLA BV, NatureWorks Inc. and Futerro Bvba. To separate L-lactide from a mix of L, meso- and D-lactide preferential crystallisation of L-lactide from the melt can be used, in which kinetically favoured crystallisation of a specific enantiomeric form—by seeding a metastable solution with this enantiomer (e.g., I-lactic acid from mixture of I- and d-lactic acid enantiomers), see e.g. US6310218B1, US6630603B1, WO/2000/056693, WO/2001/044157 and WO2014139730). Other methods are vacuum distillation (see Thyssen Krupp US20160280908A1) to remove meso-lactide, which has the lowest boiling point, or selective crystallisation, in which thermodynamically favoured crystallisation of a specific enantiomeric form is used—the specific enantiomer forms solely because it has the lowest solubility (e.g. l,l- and/or d,d-lactide versus d,l-lactide from a mixture of lactide enantiomers. Similar processes are described for chiral separation of lactic acid and lactic acid esters, but these monomers lend themselves less for chiral separation then lactide. In practice these methods are only used in high end medical applications at small scale due to their high cost and complexity. Moreover, these chiral separation processes are not very well suited to handle the daily fluctuating feedstock composition of a recycling unit.

In short, while chemical recycling is a promising end of life solution for PLA based products it is also clear that due to racemisation not always the desired performance is achieved, and the process may become very complex and uneconomic and not well suited to handle fluctuating feedstock. Therefore, a need exists for an improved method to enable the design of fully closed loop polylactic based products and enable the practical and economic recycling thereof back into high value virgin like raw materials.

OBJECT OF THE INVENTION

It is an object of the present invention to provide a method for the chemical recycling of PLA, such that PLA based products that are high in performance and recyclability, can be made, used and recycled, to enable the creation of a genuine circular loop for PLA. It is a further object of the invention to provide a PLA containing product that is suitable for use in this method.

SUMMARY OF THE INVENTION

In order to meet the object of the invention a process for chemically recycling polylactic acid (PLA) was developed, the process comprising at least a first stage of depolymerisation of the PLA and a separate second consecutive stage of depolymerisation, to which first and second stages the PLA is subjected in a continuous manner, wherein in the first stage of the two consecutive stages, the PLA is continuously fed to an extruder operated at a temperature above the melting temperature of the PLA, while a first amount of water is co-fed to the extruder, in order to produce a fluid mixture comprising a melt of the at least partly depolymerised PLA, and in the second stage, the said fluid mixture is continuously fed to a continuously stirred tank reactor (CSTR) operated at a temperature above the melting temperature of the PLA, while co-feeding a second amount of water to the CSTR, wherein a residence time in the CSTR is used to provide at the outlet of the CSTR a continuous stream of PLA depolymerised into an oligomeric ester.

This new chemical recycling process was based on the recognition that an improved method for chemically recycling PLA should be able to decompose the PLA in a reduced time and at reduced temperatures when compared to prior art chemical recycling methods, in order to avoid too much racemisation when starting with PL(L)A and therewith a too high D lactic acid content of the ultimate material that is obtained with the chemical recycling. For this, a continuous process was designed, having at least two stages in each of which partial hydrolysis takes place, leading to an oligomeric PLA (thus the mean length of the chain being at least 3 monomeric units, preferably at least 5, 6, 7, 8, 9, 10 or more monomeric units up to a maximum of 20, 30, 40, 50, 60, 70, 80, 90 or 100 monomeric units). After this, simple (ring) depolymerisation as known from the art may provide the monomeric lactides (which are in fact cyclic di-esters). This is a simple process leading to hardly any racemisation, and if so, to a predictable and relatively low amount.

It was found that this way the depolymerisation of the PLA can be accomplished in a rather short time (typically about 1-3 minutes for the extrusion step and typically up to about 40-60 minutes for the CSTR) at a rather low temperature (typically 10-30° C. above the melting temperature of the PLA, in particular about) 15-20° and can be controlled accurately in a continuous and thus energy saving process, independent of the IV of the starting material, such that the PLA is broken down to an oligomeric ester of a predetermined oligomer length, even with a very low polydispersity (typically below 2), without the need of adding a catalyst, while at the same time an intermediate viscosity in between the stages, or after the CSTR is low enough to remove any particulate matter such as pigments and fillers by simple methods such as filtration. This provides the option to use the depolymerised material to obtain high grade PLA of any required molecular weight, optionally after further depolymerisation to lactide monomers. So even without the need of adding any catalyst, in a process that requires a low amount of energy, can be accomplished in a relatively short amount of time and at relatively low temperatures PLA waste material can ultimately be upcycled to a high-grade PLA.

The invention is based on a combination of features that together provide the advantageous effect as described. Importantly, the two-stage feature, both operating at a temperature at which water is able to depolymerise the polyester, provide the option that in the first stage the amount of depolymerisation can be adjusted to the molecular weight (and thus IV) of the starting material. This way, the input for the second stage is less variable leading to an easier control of the outputted oligomeric ester. Next to the above, it is essential that the first stage comprises an extruder, such that it can be ensured that the starting material, to a great deal independent from its starting constitution, can be thoroughly mixed to become a dense homogenous melt which allows adequate control of the depolymerisation. It is believed that the mixing of the depolymerising agent, i.e. water, already at the first (extrusion) stage, leads to a shorter overall reaction time needed to obtain a certain level of depolymerisation. The extruder mixes very fast and thoroughly such that the depolymerisation reaction can already start, homogeneously throughout the PLA to be depolymerised, which may thus lead to a more efficient overall depolymerisation process. Applicant recognised that the residence time in a CSTR can be used to allow arrival at a low polydispersity level by inherent transesterification. By controlling the input of the CSTR by proper dosing of the water in the extruder, also the output of the CSTR can be adequately controlled based on temperature and residence time. Another important feature is the use of hydrolysis in both stages. Together, this leads to a process of chemical depolymerisation which can take place at relatively low temperatures and for a relatively short time, thus preventing substantial and uncontrolled racemisation. Another important aspect is that applicant has recognised that the depolymerisation need not necessarily be down to monomers, such as lactide or lactic acid. A process which leads to predetermined (mixture) of oligomers is also suitable for chemically recycling PLA, since the oligomers can be easily broken down into the monomer lactide using well known ring depolymerisation technology. Thus, applicant recognised that it is sufficient to depolymerise the PLA quickly into an oligomeric PLA, as long as its composition is able to be controlled, while at the same time ensuring that the viscosity in between the two stages or after the CSTR is low enough to be able and apply a simple technology like filtering to remove any particulate contaminants such as pigments and fillers, or any non-PLA polymer that has not been broken down in the process. By controlling the level of depolymerisation at the various stages, and thus, the obtained viscosity, it is possible in the continuous process of the present invention to apply in line filters to remove any non-PLA material, at hardly any additional energetic costs. Alternative purification methods such as the use of absorbents, e.g., active carbon, zeolite or silica, can also be applied to remove additives such as organic dyes.

It is noted that the current process can be applied independent of the type of product to be recycled, as long as it contains PLA that is in some way separable from non-PLA components such as for example metal, wood, other polymers etc. By using existing techniques, the PLA part of any PLA containing product can be obtained in pure form (notwithstanding any non-PLA additives like fillers, colourants etc. being comprised in the PLA) and used as input for the current process.

It was found that the amount of water is not essential to the depolymerisation process as such. Depending on the type of PLA, one may arrive at different levels of polymerisation (when the other circumstances, such as residence time, are the same), or vary the circumstances to arrive at a predetermined level of depolymerisation. This can be controlled by measuring the viscosity of the (partly depolymerised) PLA mixture. For the various stages of depolymerisation, a reference curve can be made beforehand that defines the relationship between viscosity and depolymerisation of the (partly) depolymerised PLA.

It is noted that in the art processes are known that partly use features of the present invention. For example, CZ 299244 (assigned to Sirek Milan) discloses a process of basic hydrolysis of waste PET based on the principle of two-stage chemolytic decomposition to terephthalic acid salt and ethylene glycol, wherein in the first stage of the process the PET waste is degraded by simultaneously running extrusion hydrolysis and glycolysis, and wherein in the second stage a melt of the resulting oligomeric products of the PET reactive extrusion leaving the first stage, is subjected in a continuous sequence and under continuous dosing of aqueous solution of alkali metal hydroxide and/or ammonium hydroxide to basic hydrolysis in the presence of a catalyst. However, this process is not suitable for depolymerising PLA because of the reactants used.

US 2012/0142958 A1 (assigned to Galactic SA) describes a process for the hydrolysis of PLA, which is however based on providing a polymer blend in a solvent of PLA in order to separate PLA from other polymers and thereafter recovering the PLA solution and subjecting the PLA solution to a catalytic hydrolysis reaction.

US 2014/0316097 A1 (assigned to Uhde Inventa-Fischer GmbH), describes a process where PLA is firstly extruded to become melted, whereafter the melt is subjected to a (partial) hydrolysis in a hydrolysis apparatus arranged downstream of the extruder, optionally followed by a depolymerisation reactor arranged downstream of the hydrolysis apparatus. This document elaborately describes the commonly known chemistry of (partial) hydrolysis of PLA using water.

U.S. Pat. No. 4,620,032 (assigned to Celanese Corporation) also discloses a two-stage hydrolysis process for polyesters. In particular, in the known process the polyester is intimately mixed with a depolymerising agent which is either one of the products resulting from the complete hydrolytic depolymerisation of the condensation polymer or water. The depolymerisation agent is mixed with the polyester for a time sufficient that the molecular weight of the polyester in a first stage is reduced by at least 50%. The treated condensation polymer of lower molecular weight is thereafter subjected in a second stage to neutral hydrolysis to effect complete hydrolytic depolymerisation to a monomeric material, which material that can be used for repolymerisation. However, for PLA a complete hydrolytic depolymerisation in the known process, leads to substantial formation of D lactide, whereas in the present invention in the two-stage process chemical depolymerisation of the PLA is performed to arrive at an oligomeric polymer (not excluding a follow up ring depolymerisation).

WO9720886 (assigned to Eastman Chemical Company) discloses a one stage batch process wherein postconsumer, or scrap polyester is reacted with ethylene glycol to produce a monomer or low molecular weight oligomer by depolymerisation of the polyester. The monomer or oligomer, as the case may be, is then purified using one or more of a number of steps including filtration, crystallisation, and optionally adsorbent treatment or evaporation.

In short, the present invention provides a process for chemically depolymerising PLA, which method avoids the formation of large and uncontrolled amounts of meso- and D lactide. This is crucial for closed loop recycling since the D/L ratio of the lactide is crucial on its turn for the properties of the new PLA to be made of the monomers. If the ultimate ratio of the D and L lactide as provided does not fit a predetermined ratio, pure D or L lactide can be added to arrive at the predetermined ratio. However, it was applicant's recognition that the D/L ratio as will be arrived at can be accurately predicted once the D/L ratio for the lactide monomers that form the PLA starting material, i.e., the PLA to be recycled, would be known. Since the process gives rise to a controlled and low level of racemisation, if any, knowing the D/L ratio of the starting material enables prediction of the D/L ratio of the ultimate depolymerised product.

Therefore, in an important embodiment of the invention, the D/L ratio of the PLA to be recycled by depolymerisation in the two-stage process of the invention is established before the PLA is fed to the extruder. If the D/L ratio of this PLA does not meet a predetermined ratio such that the D/L ratio of the ultimate lactide is not as desired (typically a D/L ratio below 0.11 or even below 0.06 is preferred), instead of topping up the product at the end of the depolymerisation process, another type of PLA can be added to the extruder at the same time, this PLA having a different D/L ratio such that in combination, the D/L ratio of the two PLA's meets the predetermined ratio. Of course, a third or further PLA can be added in order to reach the desired D/L ratio at the start of the process. In practice this means that different PLA based products are mixed, such as for example, ropes with chairs and paddles, or packaging material (high L containing PLA), to reach a desired starting ratio at the entrance of the extruder.

Although a D/L ratio of any PLA can be established by any art known means, it was applicant's recognition that it would be advantageous for the recycling process as a whole, that the D/L ratio of any product that contains PLA and is to be used in the current process to be chemically depolymerised, is known without any additional full analytical assessment of the D/L ratio of this PLA at the stage of recycling. Therefore, it would be advantageous if any such product would have a persistent marking which indicates the D/L ratio of the PLA that is present in the product. Such a marking could for example be a simple label having thereon the actual D/L ratio. However, it could also be any other marking such as a Quick Response code, bar code or any other code or sign that can be used to access a remote database wherein the D/L ratio of this product (as established for example at the production stage of the product) is durably stored. Indeed, other options are also possible as long as the marking on the product is persistent, meaning that it is durably applied such that even at the time of recycling, thus at the end-of-life of the product, thus in a post-consumer state, it is still readable, and can be used, either directly or indirectly to establish at the stage of recycling what the D/L ratio of the PLA in the product is. This could be applied in conjunction with any PLA product aimed at recycling, such as for example rugs and carpets, bathmats, paddles, chairs, surfboard fins, clothing such as T-Shirts, etc.

Definitions

PLA or polylactic acid, also known as poly (lactic acid) or polylactide is a thermoplastic polyester with backbone formula $(C_3H_4O_2)_n$ or $[\text{—C(CH}_3\text{)HC(=O)O—}]_n$, which can be obtained by condensation of lactic acid $C(CH_3)(OH)HCOOH$. It can also be prepared for example by ring-opening polymerisation of lactide $[\text{—C(CH}_3\text{)HC(=O)O—}]_2$, the cyclic dimer of the basic repeating unit.

Lactide is a cyclic ester of 2 lactic acid molecules which can occur in the form of the pure L-lactide ((S,S)-lactide), D-lactide (R,R)-lactide) or meso-lactide (S,R)-lactide) or (in most cases) in the form of a mixture of at least two of these components. The cyclising depolymerisation produces raw lactide which can contain linear oligomers, higher cyclic oligomers and residues of lactic acid and water in addition to the named isomers of the lactide. L-lactide is to be understood as the cyclic ester of two L-lactic acid units; D-lactide as the cyclic ester of two D-lactic acid units; meso lactide the cyclic ester of a D-lactic acid unit and of an L-lactic acid unit. Racemic lactide (rac-lactide) is a 1:1 mixture of L-lactide and D-lactide.

The D/L ratio of lactide is the ratio of the D and L stereo isomers of lactide. Polymerisation of a racemic mixture of D- and L-lactides usually leads to the synthesis of poly-DL-lactide (PDLLA), which is amorphous. Use of stereospecific catalysts can lead to heterotactic PLA which has been found to show crystallinity. The degree of crystallinity, and hence many important properties, is largely controlled by the ratio of D to L enantiomers used for producing the PLA. Pure PLLA is crystalline and has a typical melting temperature of about 175° C. Adding about 12% D-lactide leads to a mainly amorphous PLA with a melting temperature of about 130° C. In the art also so called stereocomplex PLA (Tm=230° C.) is known which is a mixture of sperate 100% D and 100% L PLA helix structures.

A polyester is a polymer in which the monomer units are linked together by an ester group. A polyester may contain up to 50% (w/w) of non-polyester polymer chains (e.g. 0, 1, 2, 3, 4, 5, 6, 7, 8, 9, 10, 15, 20, 25, 30, 35, 40, 45, 50%) while still being referred to as a polyester material.

The melting temperature of a polymer is the temperature above which the polymer has the properties of a liquid. Since many polymers typically do not have a very sharp melting point, the melting temperature may be the highest temperature of a fairly broad temperature range in which the polymer slowly becomes "leathery," then "tacky," and then finally liquid.

A polymer waste material is a post-consumer material at or after the end of its consumer life-time, i.e. the time during which it is used by a consumer for practical or esthetical purposes., which in essence is composed of polymer and up to 10% (e.g. 0, 1, 2, 3, 4, 5, 6, 7, 8, 9, 10) of additives like fillers (e.g. fibrous like material or particulate matter), stabilisers, colorants etc.

Depolymerising means to lower molecular weight, by breaking down the original polyester molecules to shorter length molecules down to for example oligomers.

A continuous process is a flow production process used to process materials without interruption. In such a process the materials, for example dry bulk or fluids are continuously in motion, undergoing chemical reactions and/or subject to mechanical or heat treatment. A continuous process is contrasted with a batch process.

Mixing means to combine or blend into one mass. Mixing two compounds does not exclude that the compounds react while being mixed to form other compounds in the mixture.

Intrinsic viscosity is a measure of a solute's contribution to the viscosity η of a solution, see "*Progress in Biophysics and Molecular Biology*" (Harding 1997). The IV can be measured according to DIN/ISO 1628. Typically, a concentration of 1% for the polymer is used and m-cresol as solvent, wherein the IV can be expressed in dl/g (often presented without the latter dimension). A practical method for the determination of intrinsic viscosity is by using an Ubbelohde viscometer.

Two consecutive stages means that the respective first and second stage follow in a continuous manner, thus without interruption. This however does not exclude that one or more additional intermediate process steps takes place in between the two stages.

FURTHER EMBODIMENTS OF THE INVENTION

In a further embodiment of the process according to the invention the total amount of water of the first and second amount of water (thus both amounts added up), is between 3 and 12% w/w with respect to the PLA. It was found that below 3% the depolymerisation may be to such a (low) degree that a viscosity may not be obtained that allows easy purification (e.g. by filtering) of the oligomeric material. Above 12% there is a risk that a substantial amount of water may not react which is disadvantageous for a repolymerisation process. Also, at such a high amount the depolymerisation may lead to a substantial amount of monomer or low level oligomers which is simply not needed in this process, costing extra effort in the breakdown and leading to a shift from L to D lactide. Preferably, the first amount of water is between 1 and 5% w/w with respect to the PLA, and the second amount of water is between 2 and 8% w/w with respect to the PLA. It was found that in the extruder a lower amount of water is advantageously applied since this way the goal of first stage controlled depolymerisation to a predetermined viscosity level can be obtained more easily. The higher amount of water in the second stage can be used to fine tune the depolymerisation. In the CSTR the upper limit of the amount of water is less critical than in the extruder. A preferred total amount of water used to depolymerise the PLA is believed to be between 5 and 8% w/w with respect to the PLA.

In another embodiment, the first stage comprises first and second separate consecutive sub-stages, wherein each of the first and second substages comprises a corresponding extruder, each operated at a temperature above the melting temperature of the PLA, while co-feeding an amount of water to each extruder, to produce the fluid mixture fed to the CSTR. It was found that it is advantageous to use two separate extruders (placed in line). Since the residence time in an extruder is relatively short, and thus, the length for mixing a volatile agent is limited, let alone a substantial amount of such an agent, it appeared to advantageous to use two separate consecutive extruders. An additional advantage is that the functionality and thus the operation of each of the extruders can be better tuned towards the (sub-) stage of depolymerisation. The first extruder being operated to be able and optimally convert the polymer waste material into a dense melt, whereas the second extruder being operated to be able and optimally control the depolymerisation towards a constant IV level, independent of the IV of the starting material. Preferably, the water fed to the extruder of the first sub-stage, is fed in the distal 20% of the extruder length (i.e. the last 20% of extruder length viewed in the process direction), preferably in the distal 5-15% of the extruder length, preferably at around 10% (i.e. between 9 and 11%) of the extruder length. This minimises the risk of loss of water due to evaporation and ensures at least a partial initial depolymerisation such that the second extruder is easier to be controlled. For this, the water fed to the extruder of the second sub-stage, is advantageously fed in the middle 30-70% of the extruder length, preferably in the middle 40-60% of the extruder length, preferably at around 50% of the extruder length (i.e. between 49 and 51%). This way, the provision of a melt of the PLA to a predetermined IV can be easily obtained.

Advantageously, the amount of water fed in the extruder of the first sub-stage is between 0 and 2% w/w (i.e. an amount above zero up to 2%) with respect to the PLA and the amount of water fed in the extruder of the second sub-stage is between 1 and 5% w/w with respect to the PLA. This ratio appears to be very suitable in the process of the invention.

In a further embodiment the extruder of the first sub-stage is a twin-screw extruder. Since some polyesters are sensitive to shear, it is advantageous to try and lower the amount of shear by using a twin-screw extruder. Further advantageously, the extruder of the first sub-stage is a conical twin-screw extruder. A conical shape is better able to take up the great variability of polyester waste material which in many cases is fluffy, or at least has a low density.

In another embodiment the extruder of the second sub-stage is a single screw extruder. A single screw extruder is better able to obtain a high pressure which is advantageous to mix in a higher amount of volatile reagent. The fact that a dense melt is already produced by the first extruder minimises the requirements for being able to take up materials with varying density.

In yet a further embodiment of the process according to the invention the amount of water fed in the first stage of the process is controlled by measuring a viscosity of the fluid mixture fed to the CSTR and adjusting the amount of water to arrive a predetermined value for the said viscosity, which predetermined value is preferably an intrinsic viscosity (IV) between 0.1 and 0.2 dl/g. In this embodiment a so-called loop-control is introduced in the process to ensure that the material fed to the CSTR has a predetermined viscosity (depolymerisation) level, at least within a reasonably controllable range. This supports the production of a predetermined oligomeric ester within a narrow viscosity/oligomeric range in the CSTR. In case the fluid mixture has a viscosity level that is too high (and thus, the depolymerisation rate is too low), more water is fed in the first stage to increase the depolymerisation rate. The other way around, when the viscosity level is too low, the amount of water fed in the first stage can be reduced. Methods for inline viscosity measurement can also be applied in the continuous process, such as for example the use of online viscometers as offered by Gneuss GmbH measuring the pressure drop of a small amount of the flow over a capillary pipe. Use of such inline methods allows for even better process control.

The same way, a loop control is advantageously introduced for feeding the amount of water to the CSTR. For a viscosity of the stream of oligomeric ester leaving the CSTR is measured, and the amount of water fed to the CSTR is adjusted to arrive at predetermined value for the viscosity, which predetermined value is preferably an intrinsic viscosity (IV) between 0.08 and 0.11, more preferably between 0.09 and 0.1 dl/g.

In again another embodiment the total time for subjecting the PLA to the first and second stage is less than 80 minutes (such as 75 or 70 minutes), preferably less than 65 minutes, such as 64, 63, 62, 61, 60, 59, 58, 57, 56, 55, 54, 53, 52, 51, 50, 49, 48, 47, 46, 45, 44, 43, 42, 41 or even less than 40 minutes.

In yet again another embodiment the operating temperature of the extruder and the operating temperature of the CSTR is no more than 25° C. above the melting temperature of the PLA, such as at maximum 24, 23, 22, 21, 20, 19, 18, 17, 16° C., preferably no more than 15° C. above the melting temperature of the PLA, such as 14, 13, 12, 11, 10, 9, 8, 7, 6 or even as low as 5° C. above the melting temperature of the PLA.

In still another embodiment the fluid mixture fed to the CSTR is pumped through a first filter arranged between the first stage and the second stage, the filter preferably having a mesh size between 10 and 80 μm, preferably between 30 and 50 μm, most preferably around 40 μm. Such a filter can be advantageously used to remove any particulate matter or non-PLA polymer (not broken down by the hydrolysis process) but at the same time functions as a means to homogenise the fluid mixture. The option of such a filter is made possibly since in the present method the local viscosity can be monitored and controlled. When the first stage comprises two separate consecutive extruders, a second filter is arranged between the first sub-stage and the second sub-stage of the first stage, the second filter (being upstream of the above mentioned first filter) preferably has a mesh size between 40 and 120 μm, preferably between 60 and 100 μm, most preferably around 80 μm, to remove typical contaminating particulate matter. The second filter also functions as a homogeniser. If deemed necessary, for example when desiring to introduce over 1% of water before entering the second extruder, a static mixer can be place right before or after the second filter.

Likewise, the stream of oligomeric ester is pumped through a third filter arranged after the CSTR, the third filter preferably having a mesh size below 20 μm, more preferably between 5 and 10 μm. This is to remove any remaining fine particulate matter such as pigments, or any remaining non oligomeric polymer material. Also, this way active carbon that may be added to the CSTR in order to bind any colourants, can be removed by filtration. Active carbon is ideally suitable for removing colourants given the relatively long residence time in the CSTR (when compared to the extruder(s).

For an initial repolymerisation step, the continuous stream of oligomeric ester is firstly subjected to a ring depolymerisation to provided lactide monomers, which lactides are thereafter heated to an elevated temperature (either as a further step in the continuous process or batchwise) to above the melting temperature of the PLA while subjected to a vacuum below 10 mbar, preferably below 5 mbar, preferably between 0.5 and 2 mbar, most preferably around 1 mbar, to induce repolymerisation, to arrive at a repolymerised low viscosity PLA, preferably having an IV between 0.4 to 0.6 dl/g. Additional advantage of the high vacuum is that any volatile contaminants which might be present are removed at the same time. It may be that in order to be able and arrive at the low pressure of around 1 mbar, a combination of two condensation reactors is needed (depending mainly on the amount of volatile material present in the oligomeric material). In any case, the resulting material is stable, highly pure, well defined, and thus can be easily upgraded to a high molecular weight PLA of any IV. For this, the repolymerised PLA can be heated to an elevated temperature below the melting temperature of the polyester (i.e. below 160° C., or even below 155 or 150° C.) while subjected to a vacuum (i.e. a pressure below 0.5 bar, preferably below 0.1 bar, or even below 50 mbar, 40 mbar, 30 mbar, 20 mbar or 10 mbar) or an inert gas, to induce additional repolymerisation, preferably to arrive at an IV above 0.6 dl/g. Preferably, the additional repolymerisation step is preceded by a solid-state crystallisation step by cooling down the repolymerised low viscosity PLA to a temperature well below the melting temperature of the PLA, but above its glass transition temperature, to arrive at an initially solid low viscosity PLA, and keeping the solid low viscosity PLA at that temperature until the PLA has at least partly crystallised.

The above does not exclude any variants from the process or additional process steps. For example, additional purification/filtration steps can be added. Also, the invention is not restricted to particular types of filters, although screen changer type filters are believed to be ideally suitable for a continuous process as claimed since depending on the amount of particulate matter present in any waste material comprising the PLA, filters may need to be changed every few hours. Also, when applying a filter, this may very well be a cascade of two, three or more separate consecutive filters of descending mesh size in order to withstand pressure differences over the filters. Next to this, in order to be able and fully remove all colourants and dies, the melted material may advantageously be pumped through a bed filled with (activated) carbon granules, $SiO_2$ granules, or any other small molecule absorbing material.

It is also foreseen to introduce copolymerisation in one or more of the repolymerisation steps, typically the initial repolymerisation step. Such monomers could for example also be bio-based, such as glycolide, leading to copolymers with applications in the medical field.

The invention will now be further illustrated using the following non-limiting figures and examples.

DETAILED DESCRIPTION

Example 1 provides various experiments in a single screw extruder alone.

Example 2 describes an experiment in a CSTR.

Example 3 describes various two-stage depolymerisation experiments.

Example 4 describes a ring depolymerisation experiment.

FIG. 1

Figure 1:
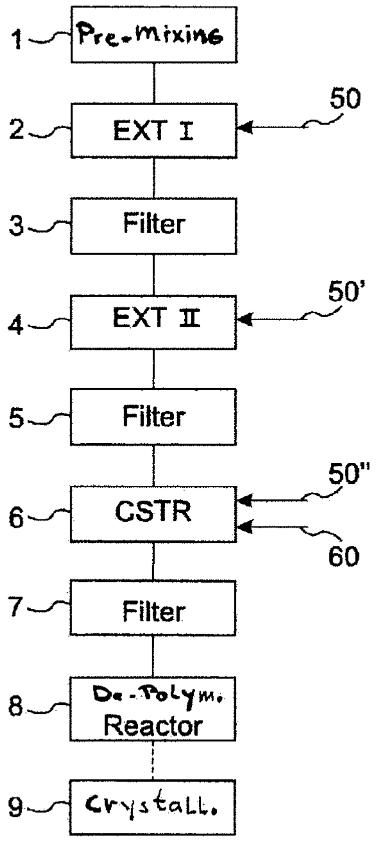
FIG. 1 schematically depicts an overview of a process according to the invention.

FIG. 1 schematically depicts an overview of a process according to the invention. In the shown process, PLA is depolymerised into oligomers and ring depolymerised to lactides, which can subsequently be repolymerised.

The process is based on the commonly known equilibrium reaction of PLA in an hydrolysis based on distilled water:

$$\text{Lactic Acid} \leftrightarrow [\text{PLA}]x + x \text{ water}$$

By adding water to the PLA melt, the equilibrium shift to the left, resulting in shorter polymer chains, ultimately oligomers (less than 100 repeating lactic acid units, in particular less than 50, 40,30, 20 or even 10 units) and decreasing viscosity. By removing water, for example by using a vacuum or nitrogen, the short chains react with each other to form PLA again. By controlling the depolymerisation rate, and thus the oligomer length, the viscosity of the material is controlled.

Contrary to polyester, PLA does not need to be dried prior to recycling as the hydrolysis uses water anyway. However, if the PLA contains too much water, typically above 4-5% w/w with respect to the PLA, a drying step may be used to arrive at a lower amount of water. PLA shredded waste material comprising pieces of (pure) PLA from packaging and durable consumer goods is pre-mixed (step 1) to obtain a predetermined D/L ratio for the mixture and is then fed to a conical co-rotating twin screw extruder (step 2).

In table 1 the D/L ratio of various products is provided as an example. In the process, the D/L ratio may rise for example with 0.01. If for example the PLA of the chairs and bathmat is mixed in a 50/50 mass ratio, the ultimate depolymerised product will have a D/L ratio of about 0.057 which is perfectly suitable to product paddles. Typically, packaging material has the lowest D/L ratio/. If needed, pure L-PLA can be fed in order to prevent that the ultimate product has a D/L value that is too high for a particular application.

TABLE 1

D/L ratios of various products

| Product | D/L ratio |
|---|---|
| Carpet | 0.0248 |
| Bathmat | 0.0244 |
| Paddle | 0.0582 |
| Visitor's chair | 0.0225 |
| Surfboard fin | 0.0137 |
| T-shirt | 0.0102 |
| Composites based on stereocomplex PLA | 0.5000 |

Due to the conical shape of the extruder the opening for feeding the material is bigger than with a conventional twin-screw extruder so feeding is easier, and it generates less shear due to a gentler natural compression giving less thermal damage to the polymer. Thermal degradation generates undesirable side reactions and formation of end groups giving an inferior end-product quality, such as for example decolouration. The extruder is operated at a temperature 5 to 25° C. above the melting point of the PLA, for instance in case of Luminy® L175 the operating temperature will be between 180 and 200° C., to melt the PLA completely. Adjacent the end of the conical twin screw extruder (at 10% of its length) an injection point for dosing water (50) is provided to obtain the first step in depolymerisation, thus reducing the viscosity. For this, about 1% of water (w/w) is dosed. The reduction of the IV also helps to minimise the pressure difference over the first filtration step (positioned between EX1 and EX2) to make it possible to filtrate with a mesh size of 80 micrometre or even lower. The filter also acts as a static mixer to homogenise the mixture and distribute the added water with the molten polymer to react completely with shorter polymer chains and a molecular weight distribution at equilibrium (dispersion grade of about 2) as a result. Process parameters are chosen such that the water is (almost) fully reacted and no (hardly any) free water is present anymore.

Figure 2:
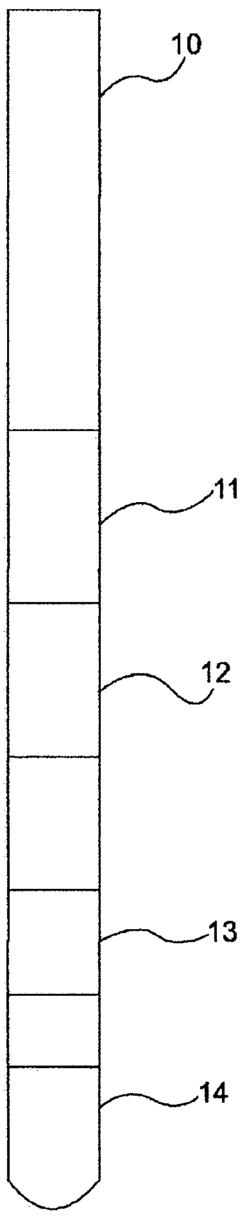
FIG. 2 schematically depicts a screw for use in a single screw reactive extrusion process.

The partly depolymerised and filtered material is fed to a single screw extruder (EX2 in step 4)). The screw design is schematically depicted in FIG. 2. This design aims at maximising the percentage water which can be dosed (50') while preventing the melt from becoming inhomogeneous. This maximum is increased by adjusting common process parameters like screw speed, pressure build up, etc. Typically, about 3-4% of water is dosed in this extruder. At the end of the extruder the viscosity of the melt is measured. The level of the viscosity is controlled by an automated control loop (not indicated in FIG. 1) controlling the level of water being dosed in the single screw extruder. This automated control loop results in a consistent viscosity, typically an IV between 0.1 and 0.2, independent of the IV of the starting material. Due to the inherent hydrolysis reaction which takes place in the extruder, the polydispersity may remain low, preferably below 2, depending mainly on the residence time in the extruder (which may be adjusted in the process by controlling initial feed and extruder speed).

The depolymerised material filtered for a second time after EX2 (step 5). Due to the IV of about 0.15 the filtration size can be reduced in comparison to the first filter, preferable being 40 micrometre or lower, without a pressure difference over the filter being too high.

The material with an IV of about 0.15 (0.1-0.2) is continuously added to the CSTR (step 6). In this CSTR also water is added (indicated by arrow 50") to further depolymerise the material to the required viscosity/oligomer length. Due to the fact that the material already has a low (controlled) viscosity upon entry, the difference in viscosity with the added water is not so big that homogeneous mixing is critical. 4-6% of water can be homogeneously mixed easily. The residence time in the CSTR is long enough (typically 25-45 minutes) to depolymerise the material to the required oligomer length, but also to have enough time for the hydrolysis reaction to maintain a polydispersity below 2. At the end of the reactor the viscosity is measured and with an automated control loop controlling the addition of water in the reactor. This results in an extremely stable continuous process hardly dependent on the type (IV) of the starting material.

In the CSTR, decolouration takes place by adding activated carbon (60). The activated carbon may be pre-selected for the best performance to absorb the colourants present in the polyester waste. After the CSTR, the low viscous oligomer/activated carbon mixture is pumped (step 7) through a three-step micro filtration (20/10/5 micrometre filters; not shown in FIG. 1) to remove the carbon particles loaded with colourant from the oligomers. A parallel set of three filters is installed so that in case of a pressure difference over the filter that is too high, the melt can be pumped through the parallel set, while the first filter set can be cleaned. Subsequently the remaining filtrated oligomer mix may be fed over various columns filled with an absorbant like active carbon, zeolites or silica to absorb any remaining colorants or other additives.

After the filtration, while the melt is still an elevated temperature of about 150 to 180° C., the melt can be cooled and stored, for subsequent processing in a PLA polymerisation plant, or, as shown in FIG. 1 it is pumped to the ring depolymerisation reactor (step 8) which is operated under vacuum at 1 mbar, at a temperature of about 210° C., to create ring closure and splitting off of lactide, with the result that the oligomeric chain length is reduced while lactide is formed. Due to the processing conditions, a PLA with an IV between 0.4 and 0.6 dl/g can be obtained. The lactide is removed from the reactor as vapor, condensed and pumped to a further lactide purification column, after which the lactide can either be pumped directly at elevated temperature into a PLA polymerisation plant or, as shown in FIG. 1 it can be crystallised (step 9) and later transported and processed as solid lactide to a PLA polymerisation plant.

FIG. 2

FIG. 2 schematically depicts a screw 10 for use in a single screw reactive extrusion process. The basic design of the screw is standard, but the screw has four non-standard zones designed for optimising the PLA/oligomer and volatile reactant. At the middle section of the screw, where the water reactant is dosed, the screw is provided with a double screw design, indicated as 11. In downstream direction, this zone is followed by a zone 12 in which the screw also is provided with a double screw design, but at which zone the screw is partially milled through (as such a known set-up for improved mixing). In further downstream direction there is an energy transfer mixing zone 13. The distal zone 14 lastly is of a so-called Saxton type.

An example of a persistent marking suitable for durable connection to a product, the marking indicating the D/L ratio of the PLA in the product, is a piece of cloth (made from 100% PLA yarn) that is suitable for durable connection to a PLA containing product, comprising a persistent coloured pattern that forms a Quick Response (QR) code. When scanned with a scanner that is operatively connected to a database that contains the D/L ratio of the PLA comprised in this product, the D/L ratio of the PLA in this product is immediately known, for example by displaying it on a display that is operatively connected to the scanner.

Example 1

Example 1 provides various experiments in a single screw extruder alone. Depolymerisation of PLA to oligomers with water by reactive extrusion is performed in a range of 10-20 kg/h. It was found that up to 3% water could be properly dosed in a single screw extruder with a standard screw design (not optimised for dosing water). Control of the moisture content of the shredded PLA waste is not necessary. The results are listed in Table 2. The amount of water used in the extruder for depolymerisation depends i.a. on the capacity of the extruder and it screw design. This has to do with the residence time in the extruder and the effectiveness of mixing water with PLA. This phenomenon is caused by too low pressure in the extruder which causes the vapor pressure of water and the low viscosity of the oligomer to push it out of the extruder and cause an unstable depolymerisation process. Increasing the pressure in the extruder will contribute positively to the stability of the depolymerisation process and the amount of water that can be added while still arriving at a homogenous mixture.

The speed of the extruder screw contributes to the mixing of water with PLA. Table 3 shows this at 10 and 15 kg/h. At a higher capacity (20 kg/h) and the same percentage of water, an opposite effect is seen. It is believed that a higher screw speed, leading to more transport, results in a residence time in the extruder that is too short for a complete depolymerisation. The mixing effect of the screw is seen in particular at speed below <70 rpm (results not shown). Then, depolymerisation becomes unstable and water is released from the extruder as vapor.

TABLE 2

Influence of PLA dosing

| % WATER | 10 kg PLA/h IV | 15 kg PLA/h IV | 20 kg PLA/h IV |
|---|---|---|---|
| 0.0 | 0.8 | 0.8 | 0.8 |
| 0.7 | n.d. | 0.28 | n.d. |
| 1.1 | n.d. | 0.23 | n.d. |
| 1.2 | 0.21 | n.d. | n.d. |
| 1.3 | n.d. | n.d. | 0.23 |
| 1.4 | n.d. | 0.21 | 0.20 |
| 1.7 | n.d. | n.d. | 0.17 |
| 1.8 | 0.17 | n.d. | n.d. |
| 2.0 | 0.18 | 0.18 | n.d. |
| 2.2 | 0.16 | n.d. | 0.17 |
| 2.4 | 0.16 | n.d. | n.d. |
| 2.5 | 0.16 | n.d. | n.d. |
| 2.6 | 0.15 | n.d. | n.d. |
| 2.7 | n.d. | 0.15 | n.d. |
| 2.8 | 0.15 | n.d. | n.d. |
| 3.0 | 0.12 | n.d. | n.d. |

TABLE 3

Influence of screw speed

| PLA kg/h | WATER kg/h | IV [—] | Extruder rpm |
|---|---|---|---|
| 10 | 0.20 | 0.17 | 70 |
| 10 | 0.20 | 0.16 | 135 |
| 15 | 0.30 | 0.17 | 113 |
| 15 | 0.30 | 0.16 | 163 |
| 20 | 0.35 | 0.18 | 139 |
| 20 | 0.35 | 0.18 | 169 |
| 20 | 0.40 | 0.17 | 139 |
| 20 | 0.40 | 0.18 | 189 |

As long as a good mixing of water with PLA takes place and sufficient reaction time is given, almost all water will react with the PLA. Virtually no water is present in the final oligomer mix leaving the second extruder.

In summary, depolymerisation of PLA to oligomers with water by reactive extrusion has been performed in a range of 10-20 kg/h. The limits within which an efficient depolymerisation process can take place have been established for these different capacities. Under the existing conditions, up to 3% water could be properly dosed on the standard extruder.

The added water was almost completely taken up during depolymerisation. The speed of the extruder screw has an influence on the process. At a capacity of 20 kg/h, a higher speed gives a higher viscosity, believed to be due to the fact that the increase in transport counteracts the effective reaction with water. At a lower capacity, a higher screw speed contributes to better mixing with water. When the speed of the screw is too low, instability of the depolymerisation process is seen, and water may be released.

Example 2

In this example a batch-wise experiment is described to try and assess whether it is possible to hydrolyse PLA to oligomers at a very low temperature above its melting temperature, viz. only about 5° C., without adding a catalyst. If so, this will also be effective in a continuous process.

For the depolymerisation of PLA by hydrolysis, the Luminy® LX175 96% L-isomer PLA from Corbion was used, which has a melting temperature (Tm) of 175° C. This material was dried and stored and subsequently sealed in an aluminium bag. Theoretically, hydrolysis of a polyester with n monomers would require n moles of water to cleave the ester bonds and would obtain 2n lactic acid. However, when a lower amount of water is used, not all ester bonds are broken down and oligomers are formed instead. These oligomers can either be further depolymerised to lactide or can be used to re-polymerise to PLA.

The mole ratio PLA:demineralised water varied between 3:1, 2:1, 1:1 and 1:2. For calculating the mole ratio, the molecular weight of the monomer was used (72,063 g/mol) to calculate the number of moles. For example, a PLA sample of 200 g would contain about 2.78 mol. The experiments therefore varied between 8.3, 12.5, 25 and 50 weight % water. A total of eight hydrolysis experiments were carried out using the PARR 4568 MINI REACTOR with temperatures between 180 and 200° C. at autogenous pressure and reaction times between 1 and 2 hours.

These temperatures have shown to be effective at breaking down PLA whilst causing little to no racemisation The reactor including reactants was flushed with nitrogen for half a minute and checked for possible leaks before heating the reaction mixture. Furthermore, extrusion was carried out at the reaction temperature; the drain valve temperature was set to 200° C. to prevent any solidification of the oligomer. Any pressure resulting from the hydrolysis in the reactor was released prior to extrusion.

Analytical Methods as Used

GPC—GPC is used to determine the chain length of the received products. The GPC was performed by a Shimadzu GPC system with a Shimadzu RID-20A Refractive index detector and an Agilent Technologies PLgel 5 μm MIXED-C 300×7.5 mm GPC column. The eluent used is Tetrahydrofuran stabilised with 0.025 to 0.04% of BHT from VWR Chemicals. The calibration was made with GPC/SEC Calibration Standards by Agilent EasiVial PS-M 2 mL.

DSC—DSC measurements were performed to establish the thermal properties Tg, Tm and Tc for the samples that resulted from the glycolysis and hydrolysis experiments using the Berstorff, ethanolysis on the PARR and the white precipitant that was formed inside the BUCHI. The differential scanning calorimetric measurements were carried out using the Perkin Elmer DSC 7. In a study by Borowicz et al. where DSC measurements were made of PLA that had undergone a transesterification with glycolysis, Tg's between −11.8° C. and −29.2° C. were observed. For these measurements, the temperature was increased in the first cycle with 15° C./min to 190° C. in nitrogen atmosphere to level the thermal history of all samples. It is then cooled with 5° C./min to −25° C. and subsequently heated with 10° C./min to 190° C. Of each sample about 5 mg was taken for the procedure; the slopes of the thermal scans are corrected by an empty pan that is subjected to the same treatment.

FTIR—FTIR analysis were executed for the samples taken from the hydrolysis, ethanolysis and glycolysis using berstorff, büchi and parr reactors. The Fourier-transform infrared spectroscopy measurements were carried out on the Thermo Scientific Nicolet Summit PRO FTIR Spectrometer Everest ATR. For each measurement a sample was placed on the measurement disk and the crystal was pressed on top. The machine was set to scan sixteen times to acquire the FTIR spectra of the compounds within the sample.

Intrinsic Viscosity—Intrinsic viscosity is connected to the viscosity average molecular weight Mv through the Mark Houwink equation. Mv lies between Mn and Mw. This is used to give insight into the chain length of the produced samples. Intrinsic viscosity was determined by an external company following ASTM-D2857-95(2007), in which chloroform is used at 25° C. (see also WO2018015528).

H-NMR—H-NMR or proton NMR is used in analytical chemistry to identify the types of bonds present in a carbon-based molecule. The graph on H-NMR shows a base line along with peaks in the spectrum and whether or not these peaks have been split. To identify a specific bond the chemical shift of the peak will be analysed and applied to the type of bond associated with the peak. A number of peaks in the process are split. This is used to identify the presence of additional CH, $CH_2$ or $CH_3$ bonds located near the bonded proton. H-NMR is crucial in identifying the molecular structure of the sample and determine if depolymerisation to lactide or ethyl lactide has been successful.

Example 3

Example 3 provides various experiments, including a two stage depolymerisation process according to the invention. In particular, this example provides results achieved with hydrolysis using water as a reactant for depolymerising PLA in a single screw extruder (see FIG. 2) and in combination with a CSTR configured as a continuous process.

Clear shredded PLA with an IV of 0.8 was used for the experiments made out of Luminy® L175 of Total Corbion PLA BV with a melting point of 175° C.

Reactive extrusion tests were performed using up to 3% w/w water with shredded PLA flakes. The hydrolysis process took place very rapidly. The PLA was depolymerised into oligomers within 30 seconds. The dosed water had almost completely reacted in this time frame. Over 98% of the dosed water had been used for the hydrolysis process. Table 4 shows the analysis results of the hydrolysis process. To increase the performance larger amounts of water have been dosed continuously in combination with a Reactor (indicated as "+CSTR").

About 2% w/w water is added to the extruder and an additional amount in the CSTR, if applicable. By choosing a filling of 10 kg in the CSTR, an average residence time of maximum 1 hour was realised at 180 to 200° C. at a capacity of 10 kg/h PLA. Steady state was reached by a total dosing of +12% water w/w. The entire hydrolysis process was carried out without additional catalyst. A viscosity (IV) as low as 0.07 could be achieved. However, even a viscosity of about 0.09-0.1 is sufficiently low to allow (micro) filtration. At a dosing of 12%, a percentage of 2-3 free water could still be detected in the oligomer.

The HPLC analysis results in Table 5 show a significant amount of lactic acid to tetramer when applying 12% water or more. However, in order to be able and filter the melt, it is not necessary to depolymerise this far. A viscosity of (IV=±) 0.1 is sufficient for the filtration process. This corresponds to a 8-10 (octa-deca) oligomer. This will require 5% to 8% water w/w.

TABLE 4

Hydrolysis of shredded clear PLA flakes (Tm 175° C.)

| Sample Nr | PLA Kg/h | WATER Kg/h | Viscosity after CSTR IV [—] | WATER free % | Remarks |
|---|---|---|---|---|---|
| 1 | 10.0 | 0.12 | 0.209 | n/a | |
| 2 | 10.0 | 0.18 | 0.173 | n/a | |
| 3 | 10.0 | 0.22 | 0.157 | n/a | |
| 4 | 10.0 | 0.29 | 0.145 | n/a | |
| 5 | 10.0 | 0.31 (3%) | 0.124 | n/a | |
| 6 | 10.0 | >2 (>20%) | 0.072 | 2.9 | +CSTR |
| 7 | 10.0 | 1.23 (12%) | 0.071 | 2.3 | Two extruders + CSTR |

TABLE 5

Analysis of the relative amount of oligomers

| Sample | lactic acid | dimer | trimer | tetra-mer | penta-mer | hexa-mer | hepta-mer | octa-mer |
|---|---|---|---|---|---|---|---|---|
| 6 | 13 | 17 | 14 | 12 | 6 | 2 | 0.6 | 0.4 |
| 7 | 10 | 15 | 14 | 10 | 5 | 1 | 0.4 | 0.3 |

Example 4

Example 4 provides various experiments in which the PLA oligomers that result from experiment 1, 2 or 3 are subsequently converted into lactide using a ring depolymerisation. In particular, these examples demonstrate that the method of the invention can successfully be applied to generate the monomer lactide, from which polymerization to PLA can be effectuated.

The experiment has been executed on a Büchi reactor with oligomers extracted from previous partial hydrolysis preformed on the PARR 4568 MINI REACTOR (see example 3). Further hydrolysis of the oligomers results in formation of lactide via back-biting reactions or intermolecular transesterification. The reactions were carried out in temperatures ranging from 195-210° C. and 200-230° C. Reactions performed at higher temperatures lead to higher lactide production. Above reaction temperatures of 230° C. the conversion to meso-lactide seem increase significantly while above 215° C. the phenomenon was rarely observed. From the pressures, the lowest pressure ((25 mm Hg)=(133, 322 Pa*25 mm Hg/1.0*10^2 mBar=33.33 mbar) resulted in the highest amount of produced lactide. Regarding the catalysts, the most efficient catalyst in terms of lactide production, was SnCl2. A catalyst concentration above 0.4 mol % will significantly increase the racemization and impurities in the product and is thereby to be avoided.

On the extracted materials of the Buchi reactor, FTIR, GPC, HNMR and DSC have been performed. The results show that the hydrolysis on Büchi has resulted in depolymerization to lactide. In the FTIR spectra of the samples taken from the Büchi reactor there were three peaks of interest: one around a wavelength around 1185 cm-1, one around 1730-142 cm-1 and a broad peak between 2700-3000 cm-1 with consistency and little variation in wavenumber, which suggests that the samples are lactide. A HNMR analysis has been carried out on the crystals found on the condenser. The chemical shifts and the associated bonds confirm that the material found was lactide.

What is claimed is:

1. A process for chemically recycling polylactic acid (PLA), the process comprising the steps of:
- at least a first stage of depolymerisation of the PLA;
- a separate second consecutive stage of depolymerisation;
- subjecting the PLA in a continuous manner to said first and second stages;
- in the first stage of the two consecutive stages, continuously feeding the PLA to an extruder operated at a temperature above the melting temperature of the PLA, while a first amount of water is co-fed to the extruder, in order to produce a fluid mixture comprising a melt of the at least partly depolymerised PLA; and
- in the second stage, continuously feeding the said fluid mixture to a continuously stirred tank reactor (CSTR) operated at a temperature above the melting temperature of the PLA, while co-feeding a second amount of water to the CSTR, wherein a residence time in the CSTR is used to provide at an outlet of the CSTR a continuous stream of PLA depolymerised into an oligomeric ester.

2. A process according to claim 1, wherein the total amount of water of the first and second amount of water, is between 3 and 12% w/w with respect to the PLA.

3. A process according to claim 2, wherein the first amount of water is between 1 and 5% w/w with respect to the PLA, and the second amount of water is between 2 and 8% w/w with respect to the PLA.

4. A process according to claim 1,
- wherein the first stage comprises first and second separate consecutive sub-stages, and
- further comprising the steps of:
  - providing each of the first and second substages with a corresponding extruder, and
  - operating each extruder at a temperature above the melting temperature of the PLA, while co-feeding an amount of water to each extruder, to produce the fluid mixture fed to the CSTR.

5. A process according to claim 4, further comprising the step of feeding the water to the extruder of the first sub-stage, in the distal 20% of the extruder length.

6. A process according to claim 4, further comprising feeding the water to the extruder of the first sub-stage, in the distal 5-15% of the extruder length.

7. A process according to claim 4, further comprising feeding the water to the extruder of the first sub-stage, at 10% of the extruder length.

8. A process according to claim 4, further comprising the step of feeding the water to the extruder of the second sub-stage, in the middle 30-70% of the extruder length.

9. A process according to claim 4, further comprising feeding the water to the extruder of the second sub-stage, in the middle 40-60% of the extruder length.

10. A process according to claim 4, further comprising feeding the water to the extruder of the second sub-stage, at 50% of the extruder length.

11. A process according to claim 4, further comprising the step of feeding the amount of water in the extruder of the first sub-stage above 0 and up to 2% w/w with respect to the PLA and the amount of water in the extruder of the second sub-stage between 1 and 5% w/w with respect to the PLA.

12. A process according to claim 4, comprising the step of arranging a filter between the first sub-stage and the second sub-stage of the first stage, the filter having a mesh size between 40 and 120 μm.

13. A process according to claim 4, comprising the step of arranging a filter between the first sub-stage and the second sub-stage of the first stage, the filter having a mesh size between 60 and 100 μm.

14. A process according to claim 4, comprising the step of arranging a filter between the first sub-stage and the second sub-stage of the first stage, the filter having a mesh size around 80 μm.

15. A process according to claim 1, further comprising the step of controlling the amount of water fed in the first stage of the process by measuring a viscosity of the fluid mixture fed to the CSTR and adjusting the amount of water to arrive at a predetermined value for the said viscosity, which predetermined value is an intrinsic viscosity (IV) between 0.1 and 0.2 dl/g.

16. A process according to claim 1, further comprising the step of controlling the amount of water fed in the second stage of the process by measuring a viscosity of the stream of oligomeric ester and adjusting the amount of water to arrive at a predetermined value for the viscosity, which predetermined value is an intrinsic viscosity (IV) between 0.09 and 0.1 dl/g.

17. A process according to claim 1, further comprising the step of subjecting the PLA to the first and second stage for a total time less than 80 minutes.

18. A process according to claim 1, further comprising the step of subjecting the PLA to the first and second stage for a total time less than 65 minutes.

19. A process according to claim 1, wherein the operating temperature of the extruder and the operating temperature of the CSTR is no more than 25° C. above the melting temperature of the PLA.

20. A process according to claim 1, wherein the operating temperature of the extruder and the operating temperature of the CSTR is no more than 15° C. above the melting temperature of the PLA.

21. A process according to claim 1, further comprising the step of pumping the fluid mixture fed to the CSTR through a first filter arranged between the first stage and the second stage, the filter having a mesh size between 10 and 80 μm.

22. A process according to claim 1, further comprising the step of pumping the fluid mixture fed to the CSTR through a first filter arranged between the first stage and the second stage, the filter having a mesh size between 30 and 50 μm.

23. A process according to claim 1, further comprising the step of pumping the fluid mixture fed to the CSTR through a first filter arranged between the first stage and the second stage, the filter having a mesh size around 40 μm.

24. A process according to claim 1, further comprising the step of pumping the stream of oligomeric ester through a filter arranged after the CSTR, the filter having a mesh size below 20 μm.

25. A process according to claim 1, further comprising the step of pumping the stream of oligomeric ester through a filter arranged after the CSTR, the filter having a mesh size between 5 and 10 μm.

26. A process according to claim 24, further comprising the step of adding active carbon to the CSTR, which carbon is removed from the oligomeric ester after this ester has left the CSTR.

27. A process according to claim 1, further comprising the steps of:

subjecting the oligomeric ester to a ring depolymerisation to provide lactide monomers, and thereafter heating said lactide monomers to an elevated temperature while subjected to a vacuum below 10 mbar, to induce repolymerisation, to arrive at a repolymerised amorphous PLA, having an IV between 0.4 to 0.6 dl/g.

28. A process according to claim 1, further comprising the steps of:

subjecting the oligomeric ester to a ring depolymerisation to provide lactide monomers, and thereafter heating said lactide monomers to an elevated temperature while subjected to a vacuum below 5 mbar, to induce repolymerisation, to arrive at a repolymerised amorphous PLA, having an IV between 0.4 to 0.6 dl/g.

29. A process according to claim 1, further comprising the steps of:

subjecting the oligomeric ester to a ring depolymerisation to provide lactide monomers, and thereafter heating said lactide monomers to an elevated temperature while subjected to a vacuum between 0.5 and 2 mbar, to induce repolymerisation, to arrive at a repolymerised amorphous PLA, having an IV between 0.4 to 0.6 dl/g.

30. A process according to claim 1, further comprising the steps of:

subjecting the oligomeric ester to a ring depolymerisation to provide lactide monomers, and thereafter heating said lactide monomers to an elevated temperature while subjected to a vacuum around 1 mbar, to induce repolymerisation, to arrive at a repolymerised amorphous PLA, having an IV between 0.4 to 0.6 dl/g.

31. A process according to claim 27, further comprising the step of heating the repolymerised PLA to an elevated temperature below the melting temperature of the PLA while subjected to a vacuum or an inert gas, to induce additional repolymerisation, to arrive at an IV above 0.6 dl/g.

32. A process according to claim 31, wherein, prior to the step of heating the repolymerised PLA, further comprising performing a solid state crystallisation step by cooling down the repolymerised amorphous PLA to a temperature between 13° and 180° C. to arrive at a solid amorphous PLA, and keeping the solid amorphous PLA at that temperature until the PLA has at least partly crystallised.

33. A process according to claim 1, wherein the PLA has a D/L ratio for the lactide monomers that form the PLA, and further comprising the step of establishing the D/L ratio of the PLA before the PLA is fed to the extruder.

34. A process according to claim 33, wherein if the said D/L ratio of the PLA does not meet a predetermined ratio, further comprising the step of additionally feeding a second PLA that has a second D/L ratio which differs from the said ratio to the extruder, such that in combination, the D/L ratio of the two PLAs meets the predetermined ratio.

* * * * *